(12) United States Patent
Newman et al.

(10) Patent No.: US 9,063,629 B2
(45) Date of Patent: Jun. 23, 2015

(54) RESPONDING TO A RECEIVED MESSAGE IN A LOCKED USER INTERACTION MODE

(75) Inventors: John-Rhys Newman, Woodland Hills, CA (US); Pascal Wever, Los Angeles, CA (US); Marco Paglia, San Francisco, CA (US); Duncan Burns, Santa Monica, CA (US); Julian Bleecker, Los Angeles, CA (US); Jacob Zukerman, San Francisco, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/285,563

(22) Filed: Oct. 31, 2011

(65) Prior Publication Data
US 2013/0111377 A1 May 2, 2013

(51) Int. Cl.
*G06F 3/048* (2013.01)

(52) U.S. Cl.
CPC ...................................... *G06F 3/048* (2013.01)

(58) Field of Classification Search
CPC ....................................................... G06F 3/048
See application file for complete search history.

(56) References Cited

U.S. PATENT DOCUMENTS

| 6,523,124 | B1 | 2/2003 | Lunsford et al. |
| 7,250,955 | B1 | 7/2007 | Beeman et al. |
| 2003/0028382 | A1* | 2/2003 | Chambers et al. ............ 704/275 |
| 2007/0300140 | A1 | 12/2007 | Makela et al. |
| 2010/0123724 | A1* | 5/2010 | Moore et al. .................. 345/473 |
| 2010/0146384 | A1 | 6/2010 | Peev et al. |
| 2011/0047368 | A1 | 2/2011 | Sundaramurthy et al. |
| 2011/0105193 | A1 | 5/2011 | Lee et al. |
| 2011/0137548 | A1 | 6/2011 | Shen et al. |
| 2011/0247067 | A1 | 10/2011 | Hirose |
| 2012/0022872 | A1 | 1/2012 | Gruber et al. |
| 2012/0084734 | A1* | 4/2012 | Wilairat ........................ 715/863 |
| 2012/0226912 | A1 | 9/2012 | King |

(Continued)

FOREIGN PATENT DOCUMENTS

| EP | 2 144 148 A2 | 1/2010 |
| WO | WO 2006/032721 A1 | 3/2006 |

OTHER PUBLICATIONS

Carroll, Adam et al.; "An Analysis of Power Consumption in a Smartphone"; Jun. 25, 2010; 2010 USENIX Annual Tech. Conf.; pp. 1-14.*

(Continued)

*Primary Examiner* — Scott Baderman
*Assistant Examiner* — Asher Kells
(74) *Attorney, Agent, or Firm* — Alston & Bird LLP

(57) ABSTRACT

A portable electronic device with first and second modes,
the first mode, associated with allowing for the availability of one or more of a first level of power consumption and processor activity for the portable electronic device, and allowing general unlocked user interaction with the user interface of the portable electronic device;
the second mode, associated with allowing for the availability of one or more of a second level of power consumption or processor activity, and allowing locked user interaction with the user interface; and
the locked user interaction allowing for the provision of one or more specific limited user inputs using the user interface, to directly interact with associated second mode output provided using the user interface in the second mode, the one or more specific limited user inputs not being associated with general unlocking of portable electronic device to enter the first mode of operation.

17 Claims, 7 Drawing Sheets

(56) References Cited

U.S. PATENT DOCUMENTS

2012/0284789 A1 11/2012 Kim et al.
2012/0311499 A1* 12/2012 Dellinger et al. ............. 715/835

OTHER PUBLICATIONS

Office Action for U.S. Appl. No. 13/285,751 dated Oct. 1, 2014.
Office Action for U.S. Appl. No. 13/285,751 dated Oct. 12, 2012.
Office Action for U.S. Appl. No. 13/285,751 dated Jun. 7, 2013.
Office Action for U.S. Appl. No. 13/285,751 dated Nov. 6, 2013.
Office Action for U.S. Appl. No. 13/285,751 dated Feb. 26, 2014.
Office Action for U.S. Appl. No. 13/285,714 dated Oct. 9, 2012.
Office Action for U.S. Appl. No. 13/285,714 dated Feb. 1, 2013.
International Search Report for application No. PCT/IB2012/056048 dated Jul. 2, 2013.
International Preliminary Report on Patentability/Written Opinion for Application No. PCT/IB2012/056048 dated May 6, 2014.
International Search Report for Application No. PCT/IB2012/056066 dated Jul. 2, 2013.
International Preliminary Report on Patentability/Written Opinion for Application No. PCT/IB2012/056066 dated May 6, 2014.
International Search Report for Application No. PCT/IB2012/056068 dated Jul. 8, 2013.
International Preliminary Report on Patentability/Written Opinion for Application No. PCT/IB2012/056068 dated May 6, 2014.

* cited by examiner

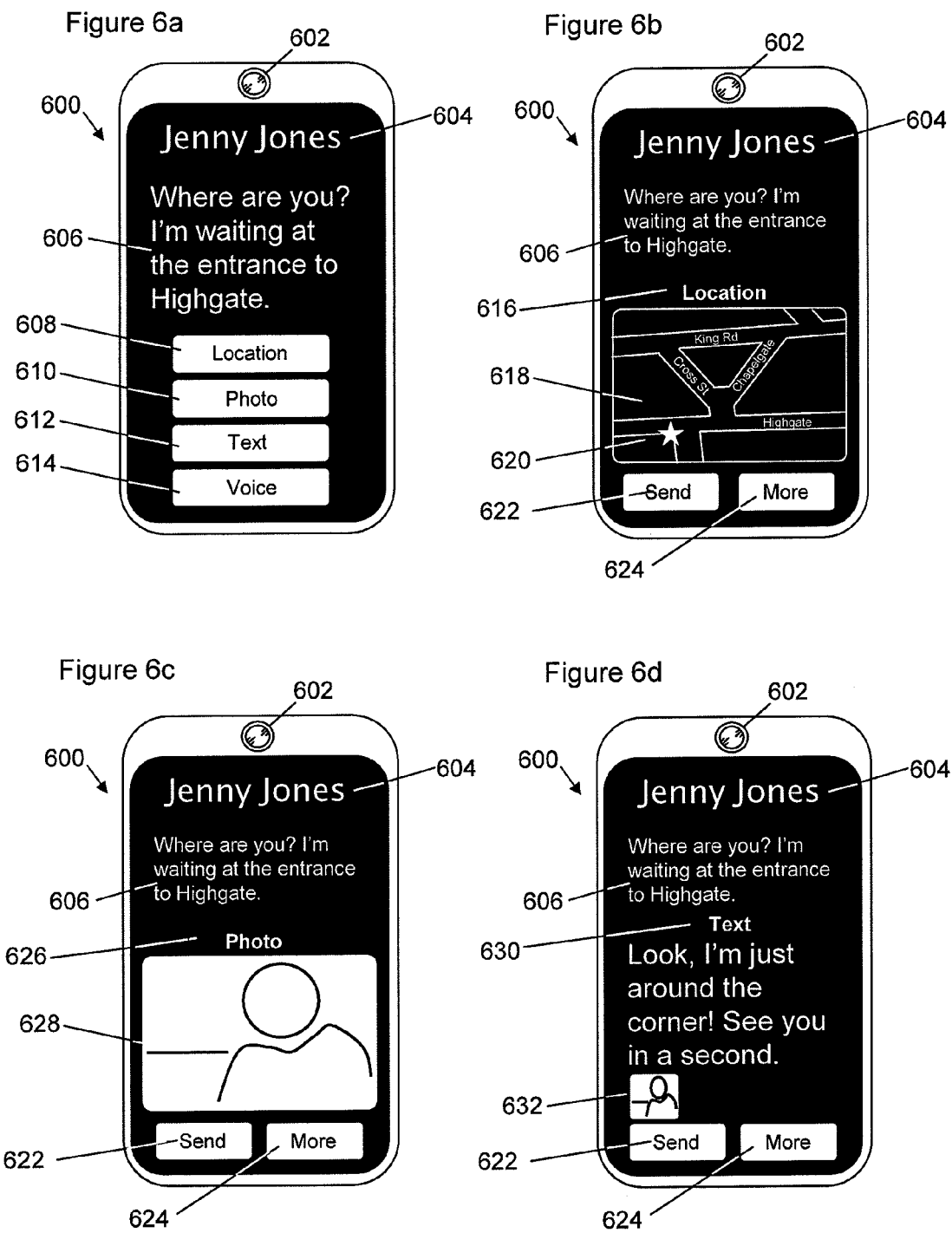

RESPONDING TO A RECEIVED MESSAGE IN A LOCKED USER INTERACTION MODE

TECHNICAL FIELD

The present disclosure relates to the field of portable electronic device modes, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet PCs.

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Electronic devices may enable one or more applications to be opened on a device. Generally, an application allows the user to access functionality of the device (e.g. use an e-mail application to write a message for transmittal, identify location-related information, connect to another device) or to access information (e.g. use a web browser to read a news website) using the device. When a device is in a fully active mode, the full range of functionality and information provided by one or more of the applications are generally available to the user, unless there are additional security restrictions associated with a particular application, such as a parental lock. Even if this is the case, the user would at least be able to attempt to access the application, or be presented with some information relating to the application they are attempting to access. If multiple applications are used, a significant amount of processor activity and/or power is usually required. Under such a fully active mode therefore, there would not be a restriction on processor activity and/or power usage so that the user can access multiple applications.

In order to lower processor activity and/or power consumption (e.g. to extend battery life) the user may turn off the portable electronic device, or enter a mode wherein user interaction with the portable electronic device is prevented and functionality is disabled (other than allowing the user to return the portable electronic device to the active mode).

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising: at least one processor; and
at least one memory including computer program code, the at least one memory and the computer program code configured to, with the at least one processor, cause the apparatus to perform at least the following:

provide a first mode of operation for a portable electronic device, the first mode configured to allow general unlocked user interaction with the user interface of the portable electronic device, the first mode associated with allowing for the availability of one or more of a first level of power consumption and processor activity for the portable electronic device;

provide a second mode of operation for the portable electronic device, the second mode configured to allow locked user interaction with the user interface of the portable electronic device, the second mode associated with allowing for the availability of one or more of a second level of power consumption or processor activity for the portable electronic device; and wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of portable electronic device to enter the first mode of operation.

The specific limited user input may comprise an activating user input, the activating user input configured to enable one or more associated functionalities to be performed using the portable electronic device, upon detection of the activating user input or during the duration of the activating user input.

The activating user input may be considered to be an input which allows additional input to be made which would not otherwise be possible without the activating user input. In this sense the activating user input is activating an additional associated functionality. The associated functionality may comprise recordal of a message by the user in response to a message received from a third party.

For example, holding down a "record" button on screen may be considered to be an activating user input, if during the input, added associated functionality is possible, such as recording a voice message. In this example, the voice message may not be recorded without the associated activating user input (holding down the "record" button). The activating user input in this example is activating the functionality of voice recordal. The additional functionality is associated with the activating user input, in this example, in the sense that holding the "record" button allows the user voice to be recorded. It may be appreciated that an activating user input may comprise touching or holding down any part of the device configured to accept input, such as any part of the screen, or the back or sides of the device.

The apparatus may be configured to enable transmission of the recorded message in response to terminating the activating user input.

For example, hold down a "record" button may allow a user to record a voice message. Releasing the "record" button, or terminating the activating user input, may in turn enable transmission of the recorded message.

The specific limited user input may be limited with respect to the general range of user input available in the first mode. That is, the user input available in the second mode may be a subset of the user input available in the first mode. In this way, the locked user interaction may be limited with respect to the general unlocked user interaction.

The locked user interaction available in the second mode of operation may be limited with respect to the general unlocked user interaction available in the first mode of operation. The locked user interaction may be a subset of the general unlocked user interaction. The general unlocked interaction may enable the user to interact with all of the applications and/or functionality of the device. The general unlocked interaction may enable the user to access all of the functionality of the device. The locked interaction may prevent the user, in the second mode, from accessing certain applications and/or functionality (which may be available in the first mode of operation).

For example, an example embodiment may have a keyboard user interface and a joystick user interface, wherein in the first mode the user can provide input via both the keyboard user interface and a joystick user interface whereas in the second mode the user can provide input only via the joystick user interface (or even the range of input detectable by the keyboard and/or joystick may be limited in the second mode).

As a further example, in the first mode, a user may be able to access all the features of a textual messaging service, such as inputting textual characters, formatting the inputted characters by changing the font, colour, or size, attaching a photograph, attaching a video file, attaching an audio file, inputting different recipients, or inputting other information related to the textual message to be sent. In the second mode, the specific limited user input allowed may be limited to inputting textual characters of a predetermined font, colour and size only.

The second mode output may be a low power output with respect to the output available in the first mode of operation.

The second level of the one or more of power consumption and processor activity may be lower than the first level of the one or more of power consumption and processor activity for the portable electronic apparatus.

The second mode of operation may allow for the user to provide specific limited user input to the portable electronic device using the user interface of the portable electronic device, to directly interact with associated output provided using the user interface in the second mode of operation, whilst keeping the portable electronic device in the second mode.

The apparatus may be configured to provide a third mode of operation for the portable electronic device, the third mode associated with allowing for the availability of one or more of a third level of power consumption or processor activity for the portable electronic device, the third level of one or more of power consumption and processor activity being lower than the second level.

The apparatus may be configured, when in the third mode, to disable user interaction with one or more applications configured to run on the apparatus but allow the user to unlock the portable electronic device to enter the first mode of operation.

The apparatus may be configured to run in the third mode, wherein the third mode may provide for a sleep mode in which user input in response to associated output cannot be provided without entering at least one of the first or second modes.

The locked user interactions of the second mode may be locked with respect to the availability of one or more of the power source, processor and functionality of the user interface.

The apparatus may be configured to allow a user interaction to move from the third mode to the second mode in response to an event.

An event may comprise one or more of receipt of a message from a third party or a scheduled event.

A specific limited user input may comprise a combination of one or more of:
 tilting the device;
 moving the device to a new location;
 interacting with a touch screen;
 pressing a touch screen;
 hovering over a touch screen;
 touching a particular region of the touch screen;
 pressing a key;
 swiping on the touch screen
 bending the device
 squeezing the device; and
 an audio signal.

The location of the device may be a geographic location. The audio signal may be a spoken message inputted by the user, for example in order to create a recorded message to send to a third party. If the apparatus is configured to operate using voice recognition, an audio signal may be inputted to accept a call from a third party.

The apparatus may be at least one of a portable electronic device, circuitry for a portable electronic device, a pocket computer, a laptop computer, a desktop computer, a tablet computer, a mobile phone, a Smartphone, a monitor, a display, a personal digital assistant, a watch, a digital camera, or a module for the same.

The apparatus/portable electronic device may comprise a display, and the display may comprise a combination of one or more of an AMOLED (active-matrix organic light-emitting diode), an e-Ink display and a LCD (liquid crystal display). For example, a display may comprise an underlying e-Ink screen, and an LCD on top, wherein the LCD may be configured to be transparent or translucent when the e-Ink screen is in use. When in the second mode, the display may be configured such that it uses less power (e.g. by reducing the colour and/or brightness, and/or changing the colour scheme of the display). For example, a Quarter Video Graphics Array OLED display may consume 3 watts while showing black text on a white background, but only 0.7 watts showing white text on a black background. That is, changing the mode of operation of the portable electronic device may comprise changing the mode of a display of the portable electronic device.

The user interface may comprise a combination of one or more of a wand, a pointing stick, a touchpad, a touch-screen, a stylus and pad, a mouse, a physical keyboard, a virtual keyboard, a joystick, a remote controller, a button, a microphone, a motion detector, a position detector, a scriber and an accelerometer.

One or more of the second level of power consumption and processor activity for the portable electronic device may be temporarily higher than the first level of power consumption and processor activity for the portable electronic device during processing and/or performance of the specific limited user input and/or the function/task associated with the specific limited user input.

Memory may comprise one or more of, for example, a CD, a DVD, flash memory, a floppy disk, a hard disk, volatile memory, non-volatile memory Random Access Memory.

The apparatus may be connected/connectable to a network. The network may be, for example, the internet, a mobile phone network, a wireless network, LAN or Ethernet. The apparatus may comprise a transmitter and or receiver to interact with a network. The transmitter/receiver may comprise, for example, an antenna, an Ethernet port, a LAN connection, a USB port, a radio antenna, Bluetooth connector, infrared port, or fibre optic detector/transmitter.

It will be appreciated that the second mode may not be an aeroplane or flight mode (e.g. where antenna transmitting and receiving functions are suspended). It will be appreciated that the second mode may not be a low battery mode, the low battery mode being activated in response to detecting that the battery level is below a predetermined threshold. It will be appreciated that the apparatus/portable electronic device may be configured to provide a flight mode and/or a low battery mode in addition to the second mode of operation. In a second aspect, there is provided a method, the method comprising:

providing/using a first mode of operation for a portable electronic device, the first mode configured to allow general unlocked user interaction with the user interface of the portable electronic device, the first mode associated with allowing for the availability of one or more of a first level of power consumption and processor activity for the portable electronic device;

providing/using a second mode of operation for the portable electronic device, the second mode configured to allow locked user interaction with the user interface of the portable electronic device, the second mode associated with allowing for the availability of one or more of a second level of power consumption or processor activity for the portable electronic device; and wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of portable electronic device to enter the first mode of operation.

In a third aspect, there is provided a computer program comprising computer program code configured to:

provide a first mode of operation for a portable electronic device, the first mode configured to allow general unlocked user interaction with the user interface of the portable electronic device, the first mode associated with allowing for the availability of one or more of a first level of power consumption and processor activity for the portable electronic device;

provide a second mode of operation for the portable electronic device, the second mode configured to allow locked user interaction with the user interface of the portable electronic device, the second mode associated with allowing for the availability of one or more of a second level of power consumption or processor activity for the portable electronic device; and wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of portable electronic device to enter the first mode of operation.

The computer program may be stored on a storage media (e.g. on a CD, a DVD, a memory stick or other non-transitory medium). The computer program may be configured to run on a device or apparatus as an application. An application may be run by a device or apparatus via an operating system.

In a fourth aspect, there is provided an apparatus, the apparatus comprising:

first means for providing configured to provide a first mode of operation for a portable electronic device, the first mode configured to allow general unlocked user interaction with the user interface of the portable electronic device, the first mode associated with allowing for the availability of one or more of a first level of power consumption and processor activity for the portable electronic device;

second means for providing configured to provide a second mode of operation for the portable electronic device, the second mode configured to allow locked user interaction with the user interface of the portable electronic device, the second mode associated with allowing for the availability of one or more of a second level of power consumption or processor activity for the portable electronic device; and wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of portable electronic device to enter the first mode of operation.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIGS. 6a-6d depict another example showing a user responding to a message received from a third party by sending their location, a photograph, and text;

DESCRIPTION OF EXAMPLE ASPECTS/EMBODIMENTS

Figure 1:
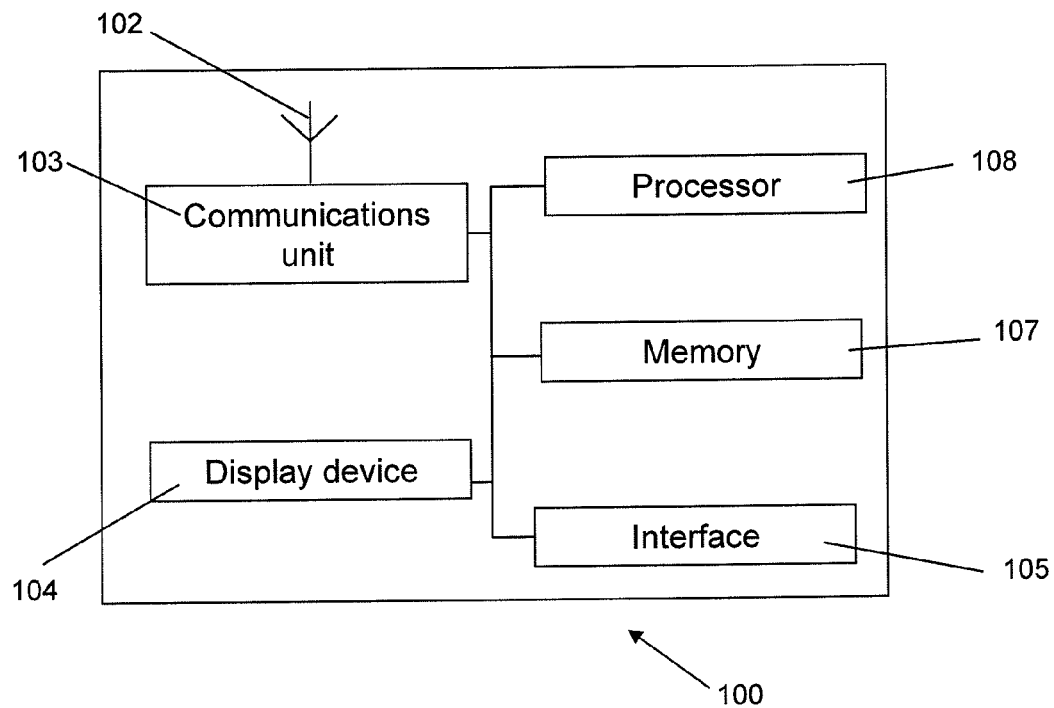
FIG. 1 illustrates an example embodiment comprising a number of electronic components, including memory, a processor and a communications unit.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It is common for a portable electronic device to have an active first mode (which may or may not be graphically based) to allow a user to generally interact with the device and generally access the full functionality of the device. For example, in the active first mode, the user may be presented with a wide range of icons and options representing different available applications available for general use. Some electronic devices have a further standby-type or sleep-type mode where the full availability of available options is disabled. For these devices the user is either presented, in an active mode, with an interface which allows complete interaction with the device, or the standby-type or sleep-type mode, which inhibits full interaction with the device. Other devices (such as the Nokia N8 mobile phone) may allow the user to lock and unlock the device (e.g. by using a slider on the side of the phone or by pressing a sequence of keys). In the unlocked mode the user may have general unlocked access to all applications and/or to the full functionality of the phone. In locked mode, the user may be able to receive a phone call, view a screen saver, but user applications and/or functionality are not available.

Example embodiments contained herein may be considered to provide a way of providing a mode of operation of a portable electronic device with intermediate functionality. For example, a mode of operation with intermediate functionality may allow the user to access desired information directly, without the need for the user to consider which on-screen or menu options he or she may need to select in order to interact with the desired information, for example, to view an internet site or to reply to a received message. Interacting with a portable electronic device using specific limited user inputs to access an intermediate level of functionality may allow for a more intuitive way for a user to interact with a portable electronic device. For example, rather than the user needing to learn how to navigate menu systems for different applications, and needing to use several different interaction gestures to perform desired operations, using specific limited user inputs may help the user access the functionality they wish to have by knowing only a few basic specific limited inputs, such as tilting and rotating the device, or tapping and swiping across the screen to move elements around the screen. Using specific limited user inputs may also provide an advantage to users who are not familiar with, or who have a limited understanding of portable electronic devices. Operating a device using locked user interaction in an intermediate-type operating mode using specific limited user inputs may require a lower level of competence and ability of the user than operating a device allowing general unlocked user interaction.

Example embodiments contained herein may be considered to provide a way of prolonging battery life and reducing processing activity. Such embodiments, for example when a portable electronic device is operating in the intermediate-type mode, may prolong the life of the battery, thus requiring the user to recharge the battery with reduced frequency. Similarly, for example, reduced processing activity may provide the user with applications with increased speed, for example faster updating of information on screen.

FIG. 1 depicts an apparatus (100) of an example embodiment, such as a mobile phone. In other example embodiments, the apparatus (100) may comprise a module for a mobile phone (or PDA or audio/video player), and may just comprise a suitably configured memory (107) and processor (108).

The example embodiment of FIG. 1, in this case, comprises a display device (104) such as, for example, a Liquid Crystal Display (LCD) or touch-screen user interface. The apparatus (100) of FIG. 1 is configured such that it may receive, include, and/or otherwise access data. For example, this example embodiment (100) comprises a communications unit (103), such as a receiver, transmitter, and/or transceiver, in communication with an antenna (102) for connecting to a wireless network and/or a port (not shown) for accepting a physical connection to a network, such that data may be received via one or more types of networks. This example embodiment comprises a memory (107) that stores data, possibly after being received via the antenna (102) or port or after being generated at the user interface (105).

The processor (108) may receive data from the user interface (105), from the memory (107), or from the communications unit (103). It will be appreciated that, in certain example embodiments, the display device (104) may incorporate the user interface (105). Regardless of the origin of the data, these data may be outputted to a user of apparatus (100) via the display device (104), and/or any other output devices provided with apparatus. The processor (108) may also store the data for later user in the memory (107). The memory (107) may store computer program code and/or applications which may be used to instruct/enable the processor (108) to perform functions (e.g. read, write, delete, edit or process data).

This example embodiment is configured to enable a plurality of modes, the plurality of modes comprising a first mode and a second mode. The first mode of operation is configured to allow general unlocked user interaction with the user interface (105) of the portable electronic device (100), and is associated with allowing for the availability of one or more of a first level of power consumption and processor (108) activity for the portable electronic device.

The second mode is configured to allow locked user interaction with the user interface (105) of the portable electronic device, and is associated with allowing for the availability of one or more of a second level of power consumption or processor (108) activity for the portable electronic device.

When changing from the first mode of operation to the second mode of operation, the portable electronic device may, for example, be configured to perform one or more of: changing the mode of the display device to a low power mode (e.g. by lowering the brightness of the screen (104)); limiting the amount of processing activity available; disabling part of the user interface (105) (e.g. such that a portion of the touch user interface is not configured to respond to user input); limiting the amount of non-persistent memory (107) available (e.g. RAM); disabling predetermined hardware (e.g. transmitter, receiver, communications unit (103)); and enabling running of applications in a second mode.

The locked user interaction of the second mode of operation allows for the user to provide one or more specific limited user inputs (e.g. limited compared to the general interaction input available in the first mode) to the portable electronic device using the user interface (105) of the portable electronic device, to directly interact with associated second mode output provided using the user interface (105) in the second mode of operation, the one or more specific limited user inputs not being associated with general unlocking of portable electronic device to enter the first mode of operation.

Figure 2:
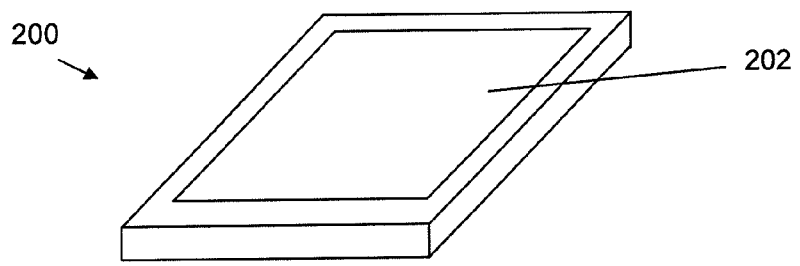
FIG. 2 illustrates an example embodiment comprising a touch-screen.

FIG. 2 depicts an example embodiment of the apparatus comprising a portable electronic device (200), e.g. such as a mobile phone, with a user interface comprising a touch-screen user interface (202), a memory (not shown), a processor (not shown) and an antenna (not shown) for transmitting and/or receiving data (e.g. e-mails, textual messages, phone calls, information corresponding to web pages).

Figure 3A:
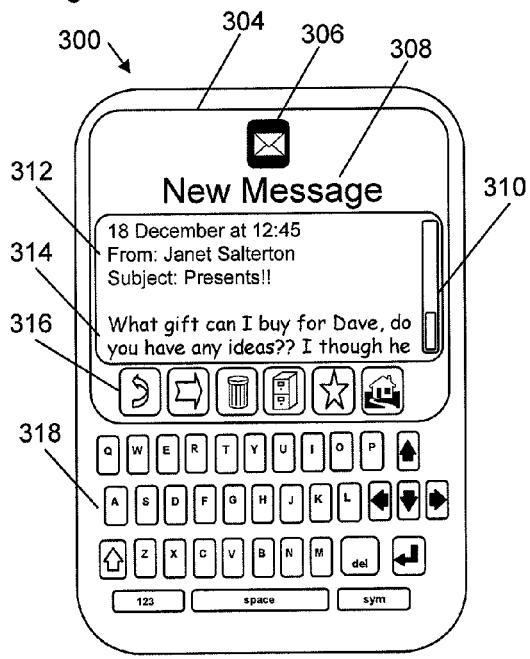
FIGS. 3a-3b depict an example embodiment showing output received from a third party on a device running an e-mail application, while operating in the first (FIG. 3a) and second (FIG. 3b) modes.
Figure 3B:
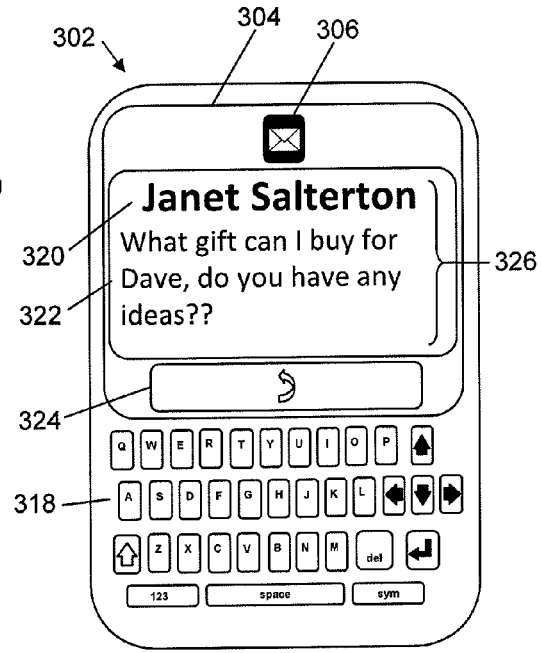

FIGS. 3a-b illustrate two views of an example embodiment with the portable electronic device (200, 300) in use. Here the portable electronic device may, for example, be a smartphone or a PDA. In FIG. 3a the device is operating in the first mode (300), and in FIG. 3b the device is operating in the second mode (302).

FIG. 3a shows an e-mail application running on the device operating in a first mode. The device has a user interface comprising a touch-sensitive screen (304) and a physical keyboard (318). The screen (304) in the example is displaying an icon (306) and a message (308) to show that a new message has been received by a third party. The message in this example is an e-mail but other possible examples include SMS, MMS, or fax messages. The message in this example is larger than the size of the screen so a scroll bar (310) is available for the user to scroll down the message and view all the message content. Details of the third party are displayed (the name of the sender) (312) alongside the date and time at which the message was sent, and the subject of the e-mail. The content of the message in this example is text (314) asking the user what gift they think the sender could buy for a friend for Christmas, along with their thoughts for possible gifts and other message content, which the user can read by scrolling down the message using the scroll bar (310). The user has several options available relating to this message (316), for example, they may wish to reply to the message, forward to message to another person, delete the message, archive the message, mark the message as important, or as a favourite message, or for later consideration, or navigate back to the home page. Selecting one of these several options (more may be envisaged), along with the possibility of scrolling (310) down the message, comprise ways via which the user may perform general unlocked user interaction with the user interface in the first mode of operation.

FIG. 3b shows the e-mail application with the device operating in a second mode. In this mode, the screen (304) in the example also displays an icon (306) to show that information (a new message) has been received by a third party. Display of such an icon is optional. The message space (326) in this example shows information received from a third party; namely part of the textual message (322) and information identifying the sender of the textual message (the sender's name (320)). The message content output in the second mode (322) corresponds to the output available in the first mode.

The details of the third party displayed (320) in this example are the sender's name. It may be envisaged that the third party details displayed are a title, such as the subject of the message (in this example, "Presents!!"), other contact information of the third party such as an e-mail address or telephone number, or a photograph of the third party.

The message content in this example is text content only, but it may be envisaged that the message content displayed in the second mode may be one or more of photographic content, image content, text content, audio content, a hashtag or a hyperlink. For example, the third party may have sent a hyperlink to an online store in the message showing a possible gift to buy for Dave, or the third party may have included a photograph of a gift idea taken in a store while shopping.

If the user is happy to reply to the third party message based on the viewed message content (322), then they do not need to consider what options are possible as they would do if using the first mode. They only have one option available, to reply (324). The user in this example may perform locked user interaction, limited to the specific limited user input of selecting the "reply" button (324), in order to directly interact with the associated second mode output (the message (322)) and reply to the message by using the user interface (the touch screen (304)) to interact with the "reply" button (324). It will be appreciated that other example activating user inputs may comprise touching or holding down any part of the device configured to accept input, such as any part of the screen, or the back or sides of the device.

By only having one button with which to reply (324), the locked user interaction may be considered more intuitive for the user as there is no need to navigate menus or select an appropriate button. It may be envisaged that in the second mode, rather than touching a particular region of the touch screen (the button region (324)), the entire screen may act as one large "reply" button and that the user only has to tap somewhere on the touch screen as their locked user interaction in order to reply to the third party's message.

The user may be able to reply by, for example, holding down the "reply" button (324) and then reciting a message to record a response. Upon release of the "reply" button (324), the dictated message may be transmitted. Choosing to reply, composing the reply, and transmitting the reply may all be achieved in the second operating mode without having to exit the second mode. Further examples describe in more detail how a user may respond to received third party messages while operating the device in the second mode.

It will be appreciated that other example embodiments may have further modes of operation in addition to the first and second modes of operation. For example, an example embodiment may have a third mode wherein all of the user interactions with the portable electronic device are disabled except those which enable the portable electronic device to be changed from the third mode into another mode (e.g. the first mode or the second mode). The third mode may be considered to be a simple background sleep mode.

Figure 4A:
FIGS. 4a-4e depict an example showing a user responding to a message received from a third party by dictating a message.

In FIGS. 4a-4e the device is operating only in the second mode. FIG. 4a shows a device (400) with a touch-sensitive screen (402) where a textual message (406) has been received by a third party (404). The device in this example also has a microphone (not shown). The user wishes to respond to the message. In this example, in FIG. 4b the user (416) has performed the locked user interaction of touching and holding the "respond" button (408) with his finger (416). This action is a specific limited user input, and is an activating user input. Holding the "respond" button (408) has activated the device to record sound for the duration of the activating user input i.e. while the "respond" button (408) is being held. The ability of the device to record sound for the duration of the input is the associated functionality.

It may be envisaged that, rather than holding down a dedicated button to provide activating user input, the user may be able to touch and hold any region of the screen or any region of the device to provide specific limited user input (which is activating user input), so that the entire screen effectively acts as one large "record" button. As a further example, a first touch may begin recording and a second touch may end recording, and may even transmit the recorded reply or message i.e. the reply may be transmitted automatically or after additional subsequent user information is added to the reply.

Figure 4B:
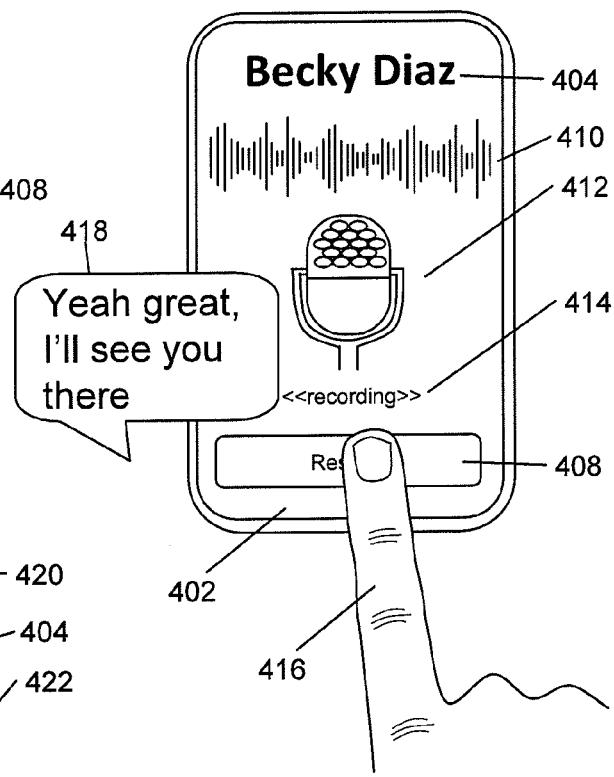

In this example, the user wishes to record a message in response to the message (406) received by the third party (404). Therefore FIG. 4b shows the user dictating a message (providing (further) specific limited user input) (418) in response to the third party's message (406) while holding the "respond" button (408) (to provide activating user input). The device may continue to display the third party's name (404) so that the user clearly knows who they are responding to. The device may show an indicator to make it clear to the user that the device is recording sound; such an indicator may, for example, be a symbol such as a microphone (412) or a message such as <<recording>> (414). An indicator may be displayed which shows the user that sound (such as the user's voice) is currently being detected and recorded by the device, such as a voiceprint indicator (410). Such a voiceprint indicator (410) may accurately reflect the user's voice being recorded, or it may not correspond to the user's voice being recorded and be symbolic only.

The device may be configured to operate voice recognition software, so that the user's recorded voice is converted by the device into a textual message (420). It may be envisaged that the device is configured to record the user's voice message and transmit an audio recording of the message rather than a textual version. It may also be appreciated that both a textual and an audio version of the message are transmitted. The user may have the option to select what format a recorded message will take. The device may be configured such that the format that the user's response takes (visual/textual or audio) is determined according to the details or preferences held relating to the third party (or even to the preferences of the user recording the reply message). For example, the user may wish to reply to a message received from a friend with poor eyesight, and so prefer to send an audio message. Alternatively, a user may wish to reply to a friend who they know is in a nightclub, building site, or other noisy environment, where a visual/textual message will be preferred.

Figure 4C:
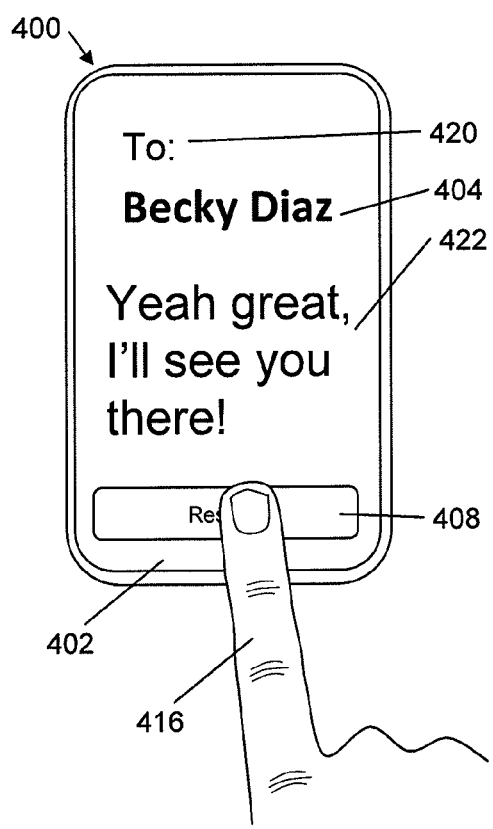

FIG. 4c of this example shows that the user has stopped speaking. In this example the user has finished dictating their message but would like to check that the message appears as they wish (422) before it is transmitted. The user therefore maintains their press (416) on the "respond" button (408), and thus continue to provide activating user input, but no longer speak. To indicate that the device has recognised that the user has finished speaking, the word "To:" (420) has appeared to show that the message as dictated and detected by the device (422) will be sent to the third party indicated (404). The user can glance at the message and ensure they are happy with it before beginning the transmission process. It may be envisaged that the user may continue to speak and add to the message if desired since the activating user input is still present. Alternatively if the user if not happy with their message as recorded they may speak again at this point and their previous message will be overwritten with the new message.

Figure 4D:
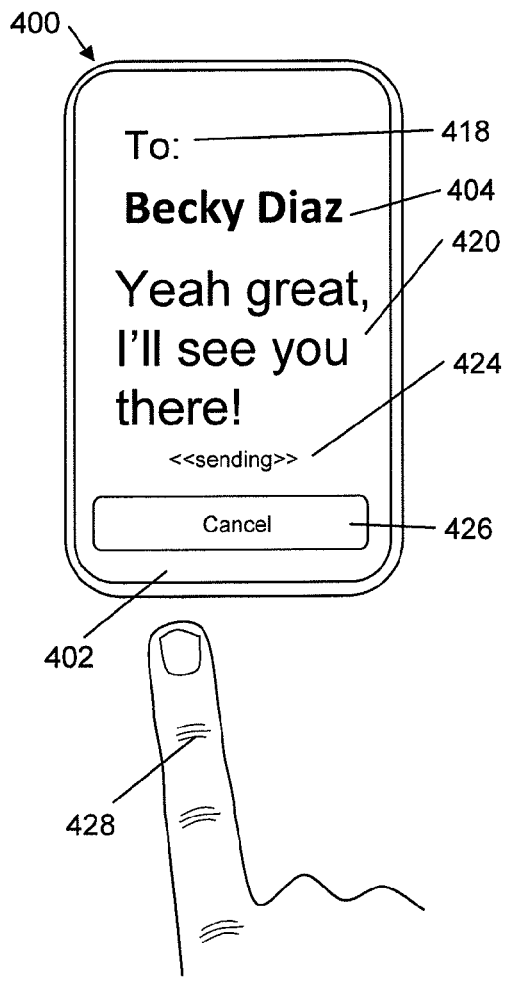

FIG. 4d shows that the user has decided they are happy with the dictated message as detected by the apparatus (420) and are happy to send it to the third party (404). They therefore release their press (428) on the button (426). Releasing the press terminates the activating user input, and automatically begins the transmission of the message (420) to the third party (404). An indicator is displayed in this example (424) to show that the message is being sent, or transmitted. In this example, terminating the activating user input also changes the text displayed on the button from "respond" to "Cancel" (426). This allows the user to cancel the transmission of the message at the last minute if they wish to.

Figure 4E:
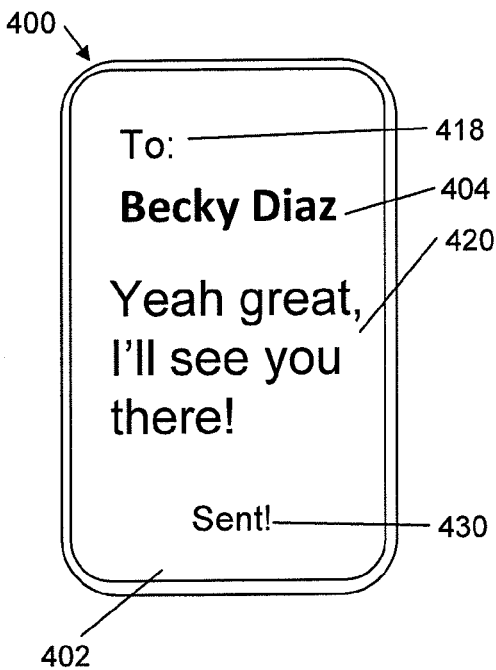

FIG. 4e shows the device (400) after the message (420) has been transmitted to the third party (404). An indicator is shown (430) to let the user know that the message has been sent. All the steps shown in FIGS. 4a-4e have occurred while the device has been operating in the second mode.

Figure 5A:
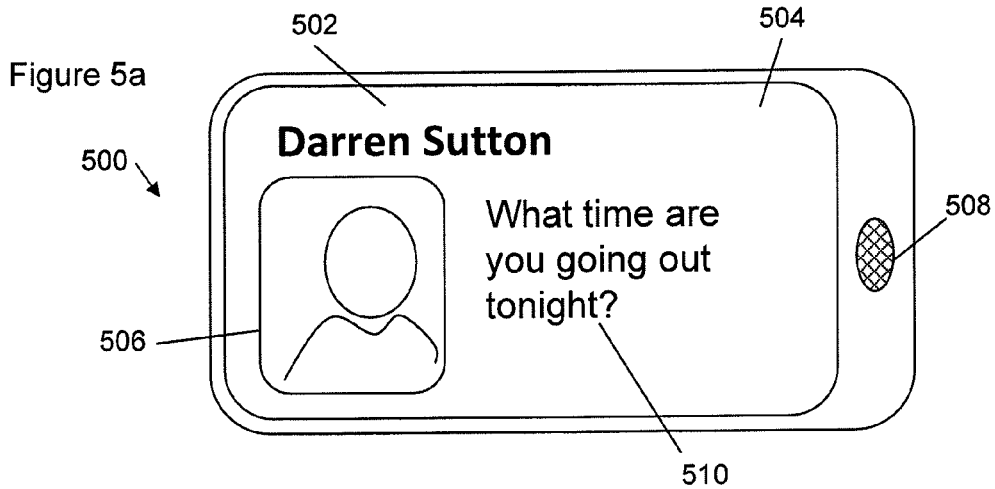
FIGS. 5a-5c depict another example showing a user responding to a message received from a third party by dictating a message.
Figure 5B:
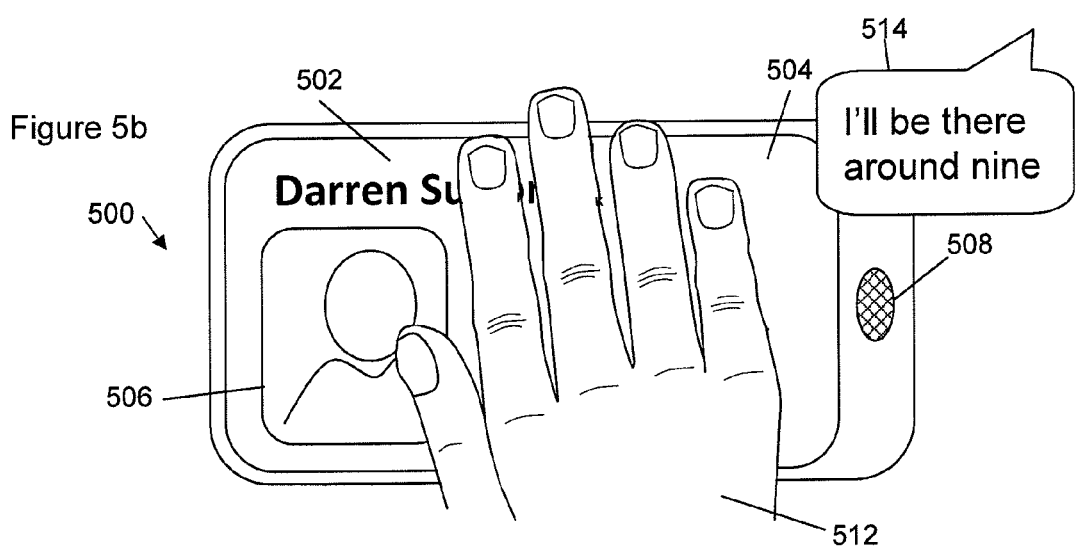
Figure 5C:
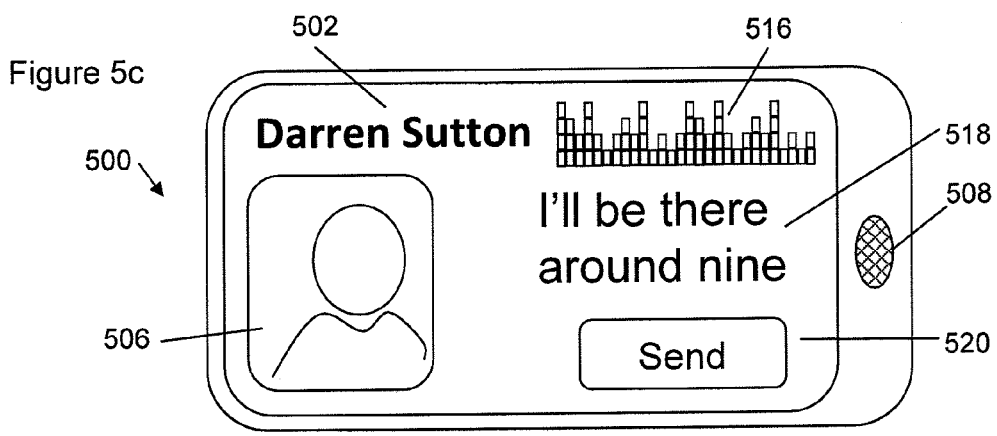

In FIGS. 5a-5c the device is operating only in the second mode. FIG. 5a shows a device (500) such as a mobile telephone, Smartphone, or tablet computer, with a screen sensitive to objects held in proximity to the screen (504). For example, hovering a finger or hand over the screen causes the device to detect a user input. The device in this example also has a microphone (508). In FIG. 4a a textual message (510) has been received by a third party (502). The third party is identified by the name (502) and an associated photograph (506) being displayed.

The user wishes to respond to the message. In this example, in FIG. 5b the user hovers or holds his hand (512) over the screen without contacting the screen to provide an activating user input and instruct the device to record audio signals (a dictated message). This hovering action is an activating user input, as it has activated the device to record sound for the duration of the activating user input i.e. while the hand is being held (512) over the screen. In other examples, continuously hovering over or touching the screen may not be required, but separate discrete interactions may begin and/or end the message recordal and transmission processes. The ability of the device to record sound for the duration of the input is the associated functionality. It may be envisaged that other activating user inputs are possible and within the scope of the disclosure, for example the device may be configured to accept deformation such as being bent or squeezed as input, or the user may be able to touch, tap, hold, swipe or perform another gesture on a touch-sensitive screen. While there is no activating user input in the current embodiment, i.e. no hand hovering over the screen, the device is unable to record audio signals including dictated messages.

In this example, the user wishes to record a message in response to the message (510) received by the third party (502). Therefore FIG. 5b shows the user dictating a message (514) in response to the third party's message (510). The device may continue to display the third party's name (502) and photograph (506) so that the user clearly knows who they are responding to.

FIG. 5c of this example shows that the user has stopped speaking and they have moved their hand away from the screen, thus terminating the activating user input. In this example the user has finished dictating their message but is able to check that the message appears as they wish (518) before transmission. An indicator may be displayed (516) to show that the message has been dictated. Such an indicator (516) may accurately reflect the user's voice recoding, or it may be symbolic only.

The dictated message in this example (518) remains on screen until the user selects the "Send" button (520). This may be done by the user hovering his hand or a finger or other object over the region of the screen displaying the "Send" button; alternatively the user may touch the send button (520), or perform another interaction to provide input instructing the device to transmit the message. It may also be envisaged that the device automatically transmits the message upon the user moving their hand away from the screen and terminating the activating user input.

The device in this example is configured to operate voice recognition software, so that the user's recorded voice is converted by the device into a textual message (518). It may be envisaged that the device is configured to record the user's voice message and transmit an audio recording of the message rather than a textual version. It may also be appreciated that both a textual and an audio version of the message are transmitted. Alternatively, the device may be configured to display a virtual keyboard, or allow the connection of an external keyboard, via which the user can enter his message rather than dictating a message.

A further example may be envisaged of a device with calling capabilities, such as a mobile telephone or Smartphone, with a touch-sensitive screen. The device also has a microphone. In this example, a user has missed a call from a third party (i.e. the user failed to answer the call when it was made), and the device, operating in the second mode, displays information to indicate that the user has missed a call. Such information may be an icon, symbol, or details of the missed call such as the caller's name, the caller's telephone number, or the time that the call was made. The device may be able to display details of more than one missed call.

The user sees that he has missed a call on his device, and wishes to respond to the missed call. In this example, the user provides an activating user input by, for example, holding down the screen, holding down a button or region on the screen, squeezing the device, or pressing the back, side(s) or front of the device. During this activating user input the device is activated to record sound for the duration of the activating user input. In other examples, continuously providing activating user input may not be required, but separate discrete interactions may be used to begin and/or end the message recordal and transmission processes. The ability of the device to record sound for the duration of the activating user input is an example of associated functionality. If there is no activating user input in the current embodiment, i.e. no touch or suitable interaction with the device, the device does not record audio signals, including dictated messages, in response to the received message. For example, the user is unlikely to accidentally dictate a message while the phone is in his or her pocket, or on a table, since an activating user input is required to allow dictation in response to a received message.

In this example, the user wishes to record a message in response to the missed call, and therefore the user, while providing an activating user input, dictates a message in response to the missed call. The device may display the third party's details so that the user clearly knows who they are responding to. The device may also display an indication that sound is being successfully recorded during the activating user input.

When the user has finished dictating a response to the missed call, he terminates the activating user input (for example, releases a hold or press on the device.) The dictated message in this example is then automatically sent to the caller whose call was missed by the user. It may be envisaged that in other examples, the user provides a further input before the message is sent, such as tapping a "Send" button displayed after the message dictation has ended in order to send the message.

Another example may be envisaged of a device with calendar functionality, such as a mobile telephone, Smartphone, or tablet PC with a touch-sensitive screen. The device also has a microphone. In this example, the device has a calendar application and, in the second mode, there is a calendar event displayed on screen. The calendar event may be displayed by an icon or symbol displayed on the device, or by details of the event displayed on the device, such as the name of the meeting or event, the location, the time and date of the meeting, a map of where the meeting is to take place, a list of one or more participants in the meetings, or other information related to the calendar entry. The calendar event may be being displayed by the device in the second mode due to a scheduled alarm set to alert the user that the event is imminent (for example, within a predetermined period of time); or the event may be the next calendar entry due to happen, or the user may have identified the event being shown as a favourite and therefore to be the first event to be shown of all recorded events in the calendar.

In this example the user wishes to send a message to all the participants registered as attending the meeting being displayed on the device; he may for example wish to inform them that he will be late attending, or he may wish to remind them to take along certain documentation for the meeting. The calendar application has the functionality to associate names of participants with calendar entries; the details of the participants may be stored on the device in an address-book type application which the calendar application can access. In this example, the user provides an activating user input to the device by, for example, holding down the screen, holding down a button or region on the screen, squeezing the device, or pressing the back, side(s) or front of the device. During this activating user input the device is activated to record sound for the duration of the activating user input. The ability of the device to record sound for the duration of the activating user input is an example of associated functionality. If there is no activating user input in the current embodiment, i.e. no touch or suitable interaction with the device, the device will not accidentally allow a response, such as recording a dictated messages in response to a calendar entry being displayed in the second mode.

The device may display the details of the meeting or participants so that the user clearly knows who they are dictating a message to and for what reason. For example, the user may wish to refer to the name of the meeting in his dictated message, and the device can display the name of the meeting on the screen during the dictation of the message so that the user has a prompt as to the meeting name. The device may also display an indication that sound is being successfully recorded during the activating user input.

When the user has finished dictating a response for the meeting participants, he terminates the activating user input (for example, releases a hold or press on the device). The dictated message in this example is then automatically sent to all participants of the meeting upon release of the activating user input. It may be envisaged that the communication details (e-mail address, mobile telephone numbers, etc) are held on the device, possibly in an address book type application, and the details may be accessed by the device in order to send the participants the user's dictated message.

It may be envisaged that in other examples the user has the option of reviewing the dictated message by listening back to the recording, or viewing the text created using voice-recognition software operating on the device, and the user then provides a further input to send the message after reviewing it. Such a further input may be tapping a "Send" button displayed after the message dictation has ended and when the user has had the opportunity to review the dictated message.

Advantages of replying to a message using some of the above examples are that the user need not be concerned with typing in a reply; they can simply provide an activating user input, speak, and the device has the capability to detect and record, then transmit the user's message. Further, the user interaction with the device may be considered intuitive and simple; the user only has to provide an activating user input, (which may be a relatively simple gesture such as holding a button, contacting a screen, hovering a finger or hand over a screen, or deforming (part of) a device), and then speak, and after terminating the activating user input the message can be sent. The user need not be concerned with navigating any menus, or selecting any options or buttons. Such example may provide an advantage for users who are less confident or familiar with operating such portable electronic devices as the operations required by the user are relatively simple. Such an example device may provide advantages for users who have limited motor control and who find operating devices with relatively small buttons difficult. Such a user may find it easier to send messages to contacts using a portable electronic device by performing a relatively simple gesture to provide activating user input, and then dictating a message, rather than using a device requiring the user to type a message using a keyboard or navigate menus on-screen.

FIGS. 6a-6d illustrate an example where the device (600) is configured to allow a user to reply to a third party's message by sending a response comprising one or more of a location, a photograph, a textual message entered using a keyboard, or a voice recorded message. It will be appreciated that other information could be transmitted in the message. The device (600) could be a Smartphone, a PDA, a tablet PC, or other portable electronic device. In this example the device comprises a camera (602). The device is also capable of determining its location using GPS.

FIGS. 6a-d show that the portable electronic device is in the second mode of operation. The second mode is configured to allow locked user interaction with the user interface of the portable electronic device, and is associated with allowing for the availability of one or more of a second level of power consumption or processor activity for the portable electronic device. For this embodiment, the screen is placed in a low power mode by configuring the pixels corresponding to the background to be turned off (making them black) and configuring the pixels corresponding to text and user interface elements to be white. This reduces the power consumption of the screen whilst the portable electronic device is on the second mode. It will be appreciated that other example embodiments may be configured to turn all or portions of a screen into a low power mode (e.g. by turning off a backlight, reducing the contrast, selecting colour schemes which reduce power). Such forms of output can be considered to be low power output. Available power consumption and/or processor activity is also restricted by reducing the number of applications which are available to be accessed/run in the second mode.

In FIG. 6a, the user has received a textual message from a third party (604) whose name is displayed on the device screen. The message content (606) is displayed and in this example the third party is waiting to meet the user at Highgate, and is asking the user where he is. The user wishes to respond, and in this example may do so by transmitting one or more of his location, a photograph, a textual message, or a voice recording.

To input each of these types of message content, in this example the device displays a button to enter the location (608), a photo (610), a text message (612) or a voice message (614). In this example holding one of the keys (608), (610), (612) or (614) provides the device with an activating user input, and allows the user to record message content during the duration of the activating user input, or upon detection of the activating user input (e.g. after an input interaction which is momentary, such as a tap or click, compared to the duration of dictation of a message). It will be appreciated that the device may be configured for input when the device is deformed by squeezing, or bending, for example, and as an alternative to a user being required to tap or select an onscreen button, the screen may indicate regions along the side of the device which, when squeezed, correspond to selecting a particular option such as "Location", "Photo" etc. For example, squeezing at the required point on the side of the device corresponding to "Location" would select the "Location" option, thus performing the same function as if the user were required to select the "Location" button.

In FIG. 6b the user has decided to transmit his location to the third party in response to her message. He holds down the "location" button (608) in FIG. 6a and during this hold, the device determines the GPS coordinates of the device and from these is able to create a map showing the location of the device. The ability of the device to determine its GPS coordinates and generate a map displaying the location of the device is an associated functionality, associated with the activating user input of holding or activating the "location" button (608). After the user releases his hold of the "location" button (608), thereby terminating the activating user input, the screen shown in FIG. 6b is displayed. The device displays the third party to whom the message will be transmitted (604) along with the third party's message to which the user is replying, so that the user is sure who will receive the message and in what context. The label "Location" (616) is displayed so that the user can see what type of message content he has input. The location of the user (620) is shown on a map (618) generated by the device according to the determined GPS coordinates, determined during the activating user input. The user now has the option of sending the message by tapping the "Send" key (622) or adding further content to the message by tapping the "More" key (624). It will be appreciated that, the device may not require any user interaction after the release of the activating user input and may automatically transmit the message upon termination of the activating user input or release of the "location" button. The device may allow a 'delay' of a predetermined time period, such as 5 s (or another time), in which the user has the option of selecting the "Send" (622) or "More" (624) keys before the message is automatically transmitted to the third party.

In FIG. 6c the user has decided to transmit a photograph to the third party in response to her message. He may wish, for example, to send a photograph of himself with a landmark in the background so that the third party can see where he is. In this example, the user holds down the "photo" button (610) in FIG. 6a and during this hold, the camera (602) of the device (600) takes a photograph and uses the photograph taken as content for the message to be transmitted. The ability of the device to take and display a photograph is an associated functionality, associated with the activating user input of holding the "photo" button (610). After the user releases his hold of the "photo" button (610), thereby terminating the activating user input, the screen shown in FIG. 6c is displayed. The device displays the third party to whom the message will be transmitted (604) along with the third party's message to which the user is replying, so that the user is sure who will receive the message and in what context. The label "Photo" (626) is displayed so that the user can see what type of message content he has input. The photograph taken by the user (628) is displayed, as taken during the activating user input. The user now has the option of sending the message by tapping the "Send" key (622) or adding further content to the message by tapping the "More" key (624). It will be appreciated that, in this example, the device may not require any user interaction after the release of the activating user input and may automatically transmit the message upon termination of the activating user input. The device may allow a 'delay' of a predetermined time period, such as 5 s (or another time), in which the user has the option of selecting the "Send" (622) or "More" (624) keys before the message is automatically transmitted to the third party.

In this example, following from the message content recorded in FIG. 6c, the user also wishes to dictate a message to be sent with the photograph (628) in response to the third party message (606). He has tapped the "More" button (624) after taking a photograph to add more content to the message. The device displays the screen as shown in FIG. 6a and the user chooses to hold the "Voice" button (614) and dictate a message. Holding the "Voice" button (614) provides activating user input, and allows the user to dictate a message, perhaps according to one of the previously described embodiments. Recordal of this message is performed in response to the message received by the third party (606). After recording the voice message and terminating the activating user input (by releasing the "Voice" button (614), the device in this example uses voice recognition to display the recorded message as text (632). Since this textual message (632) has been recorded in order to be transmitted to the third party along with a photograph (628) taken by the user, the photograph previously taken in response to the message is shown on screen (634) with the recorded message (632). In this way the user knows what content will be transmitted. After releasing the "Voice" key, the user is presented with the options of sending the message by tapping the "Send" key (622) or adding still further content to the message by tapping the "More" key (624). It will be appreciated that, in this example, the device may not require any user interaction after the release of the activating user input and may automatically transmit the message upon termination of the activating user input. The device may allow a 'delay' of a predetermined time period, such as 5 s (or another time), in which the user has the option of selecting the "Send" (622) or "More" (624) keys before the message is automatically transmitted to the third party.

Following the example shown in FIG. 6d, it may be envisaged that the user may similarly record a textual part of a message by typing in text rather than dictating a message. He may do this by tapping the "Text" key (612), whereby a virtual keyboard may be displayed on screen for the user to type in his message. It will be appreciated that while this method of inputting message content does not rely on an activating user input allowing associated functionality for the duration of such an activating user input, recording a message in this way is included within the scope of the disclosure.

It will be appreciated that other example embodiments may have further modes of operation in addition to the first and second modes of operation. For example, an example embodiment may have a third mode (e.g. a simple background mode) wherein all of the user interactions with the portable electronic device are disabled except those which enable the portable electronic device to be changed from the third mode into another mode (e.g. the first mode or the second mode). It will be appreciated that, when in a third mode, the portable electronic device may be configured to change into a second mode in response to an event (e.g. in response to receiving a message, or a scheduled calendar event).

It will be appreciated that, by providing the user with a second mode which allows only specific limited user inputs, the user may interact with the device more intuitively and easily in the second mode. In addition, it may prevent the user from making unwanted or accidental interactions with the portable electronic device whilst retaining useful functionality. It may also allow the battery life of the portable electronic device to be extended. For example, if the user wishes to perform a simple task using the device he may not need to activate the full functionality of the device to do so.

It will be appreciated that other example embodiments may or may not enable the reception of calls (e.g. telephone calls) whilst in the second mode. For example, an example embodiment may, in response to receiving a call, automatically change the mode of the device into the first mode from the second mode. In the first mode, the apparatus would enable general unlocked interaction with the portable electronic device for example, to accept/reject the call and interact with other applications apart from the call application, at least while the call was active. The device may then automatically return the device to the second mode upon the call being finished/rejected. Another example embodiment may enable the reception/acceptance of calls whilst remaining in the second mode of operation and thus not allow general interaction (e.g. with other applications apart from the call application) while the call is active.

Figure 7:
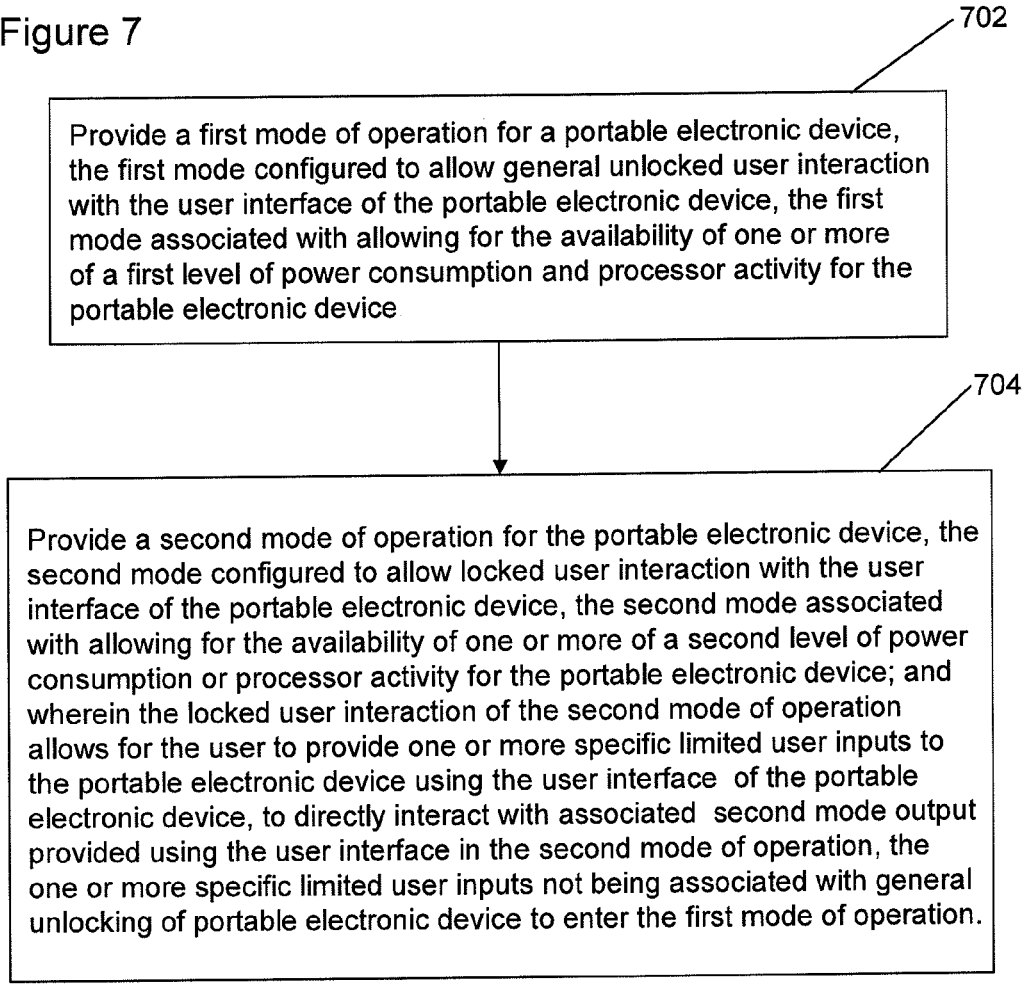
FIG. 7 depicts a flow diagram describing a method used to provide first and second modes of operation of a portable electronic device.

FIG. 7 shows a flow diagram illustrating the operation of different modes of the portable electronic device in steps (702) and (704), and is self-explanatory.

Figure 8:
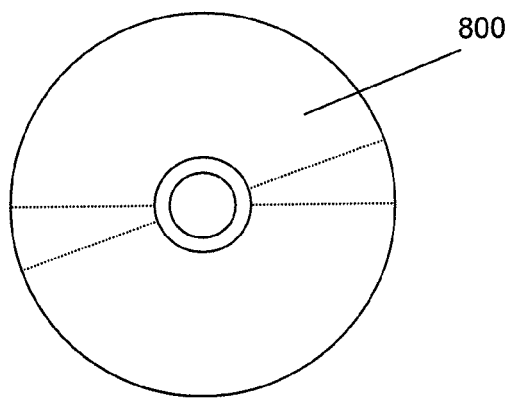
FIG. 8 illustrates schematically a computer readable medium providing a program according to an embodiment of the present invention.

FIG. 8 illustrates schematically a computer/processor readable media 800 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" or processor described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one memory including computer program code,
the at least one memory and the computer program code configured to, with the at least one processor, cause the apparatus to perform at least the following:
provide a first mode of operation for a portable electronic device, the first mode configured to allow general unlocked user interaction with the user interface of the portable electronic device, the first mode associated with allowing for the availability of one or more of a first level of power consumption and processor activity for the portable electronic device;
provide a second mode of operation for the portable electronic device, the second mode configured to allow locked user interaction with the user interface of the portable electronic device, the second mode associated with allowing for the availability of one or more of a second level of power consumption or processor activity for the portable electronic device,
wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of the portable electronic device to enter the first mode of operation,
wherein the one or more specific limited user inputs comprise an activating user input, the activating user input configured to enable one or more associated functionalities to be performed using the portable electronic device during the duration of the activating user input,
said one or more associated functionalities comprising recordal of a message by the user in response to a message received from a third party, the recordal of the message comprising recordal by one or more of: voice dictation, location capture, image capture, and composition of a textual message; and
cause transmittal of the recorded message in response to termination of the activating user input.

2. The apparatus of claim 1, wherein the specific limited user input is limited with respect to the general range of user input available in the first mode.

3. The apparatus of claim 1, wherein the second mode output is a low power output with respect to the output available in the first mode of operation.

4. The apparatus of claim 1, wherein the second level of the one or more of power consumption and processor activity is lower than the first level of the one or more of power consumption and processor activity for the portable electronic apparatus.

5. The apparatus of claim 1 wherein the second mode of operation allows for the user to provide specific limited user input to the portable electronic device using the user interface of the portable electronic device, to directly interact with associated output provided using the user interface in the second mode of operation, whilst keeping the portable electronic device in the second mode.

6. The apparatus of claim 1 configured to provide a third mode of operation for the portable electronic device, the third mode associated with allowing for the availability of one or more of a third level of power consumption or processor activity for the portable electronic device, the third level of one or more of power consumption and processor activity being lower than the second level.

7. The apparatus of claim 6, configured, when in the third mode, to disable user interaction with one or more applications configured to run on the apparatus but allow the user to unlock the portable electronic device to enter the first mode of operation.

8. The apparatus of claim 6, configured, when in the third mode, to provide for a sleep mode in which user input in response to associated output cannot be provided without entering at least one of the first or second modes.

9. The apparatus of claim 1, wherein the locked user interactions of the second mode are locked with respect to the availability of one or more of the power source, processor and functionality of the user interface.

10. The apparatus of claim 6 configured to allow a user interaction to move from the third mode to the second mode in response to an event.

11. The apparatus of claim 10 wherein the event comprises one or more of:
   receipt of a message from a third party, and
   an scheduled event.

12. The apparatus of claim 1, wherein a specific limited user input comprises one or more of:
   tilting the device;
   moving the device to a new location;
   interacting with a touch screen;
   pressing a touch screen;
   hovering over a touch screen;
   touching a particular region of the touch screen;
   pressing a key;
   swiping on the touch screen;
   bending the device
   squeezing the device; and
   an audio signal.

13. The apparatus according to claim 1, wherein the apparatus is at least one of a portable electronic device, circuitry for a portable electronic device, a pocket computer, a laptop computer, a desktop computer, a tablet computer, a mobile phone, a Smartphone, a monitor, a display, a personal digital assistant or a digital camera or a module for the same.

14. The apparatus of claim 1, wherein the user interface comprises a combination of one or more of a wand, a pointing stick, a touchpad, a touch-screen, a stylus and pad, a mouse, a physical keyboard, a virtual keyboard, a joystick, a remote controller, a button, a microphone, a motion detector, a position detector, a scriber and an accelerometer.

15. The apparatus of claim 1 wherein one or more of the second level of power consumption and processor activity for the portable electronic device are temporarily higher than the first level of power consumption and processor activity for the portable electronic device during processing and/or performance of the specific limited user input and/or a function/task associated with the specific limited user input.

16. A method, the method comprising:
   providing a first mode of operation for a portable electronic device, the first mode configured to allow general unlocked user interaction with the user interface of the portable electronic device, the first mode associated with allowing for the availability of one or more of a first level of power consumption and processor activity for the portable electronic device;
   providing a second mode of operation for the portable electronic device, the second mode configured to allow locked user interaction with the user interface of the portable electronic device, the second mode associated with allowing for the availability of one or more of a second level of power consumption or processor activity for the portable electronic device,
   wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of the portable electronic device to enter the first mode of operation, and
   wherein the one or more specific limited user inputs comprise an activating user input, the activating user input configured to enable one or more associated functionalities to be performed using the portable electronic device during the duration of the activating user input,
   said one or more associated functionalities comprising recordal of a message by the user in response to a message received from a third party, the recordal of the message comprising recordal by one or more of: voice dictation, location capture, image capture, and composition of a textual message; and
   causing transmittal of the recorded message in response to termination of the activating user input.

17. A computer program stored on a non-transitory medium, the computer program comprising computer program code configured to:
   provide a first mode of operation for a portable electronic device, the first mode configured to allow general unlocked user interaction with the user interface of the portable electronic device, the first mode associated with allowing for the availability of one or more of a first level of power consumption and processor activity for the portable electronic device;
   provide a second mode of operation for the portable electronic device, the second mode configured to allow locked user interaction with the user interface of the portable electronic device, the second mode associated with allowing for the availability of one or more of a second level of power consumption or processor activity for the portable electronic device,
   wherein the locked user interaction of the second mode of operation allows for the user to provide one or more specific limited user inputs to the portable electronic device using the user interface of the portable electronic device, to directly interact with associated second mode output provided using the user interface in the second mode of operation, the one or more specific limited user inputs not being associated with general unlocking of the portable electronic device to enter the first mode of operation, and
   wherein the one or more specific limited user inputs comprise an activating user input, the activating user input configured to enable one or more associated functionalities to be performed using the portable electronic device during the duration of the activating user input,
   said one or more associated functionalities comprising recordal of a message by the user in response to a message received from a third party, the recordal of the message comprising recordal by one or more of: voice dictation, location capture, image capture, and composition of a textual message; and
   cause transmittal of the recorded message in response to termination of the activating user input.

* * * * *